Dec. 25, 1945.　　　R. W. GOBLE ET AL　　　2,391,411
TERRAIN-LEVEL ALTIMETER
Filed Jan. 24, 1941　　　2 Sheets-Sheet 2
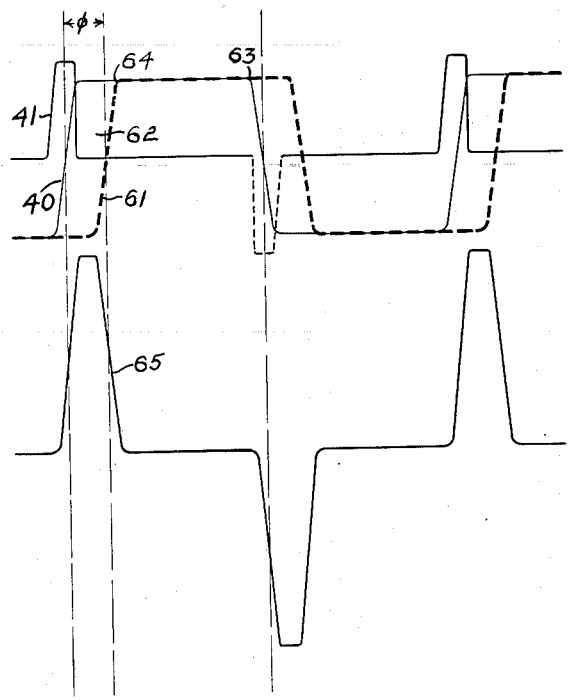
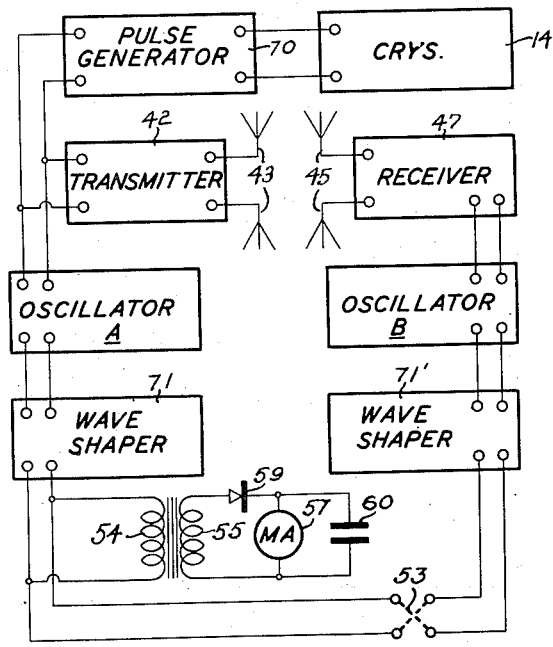
INVENTORS,
OLIVER V. PHILLIPS.
RALPH W. GOBLE.
DONALD K. LIPPINCOTT.
BY
ATTORNEYS.

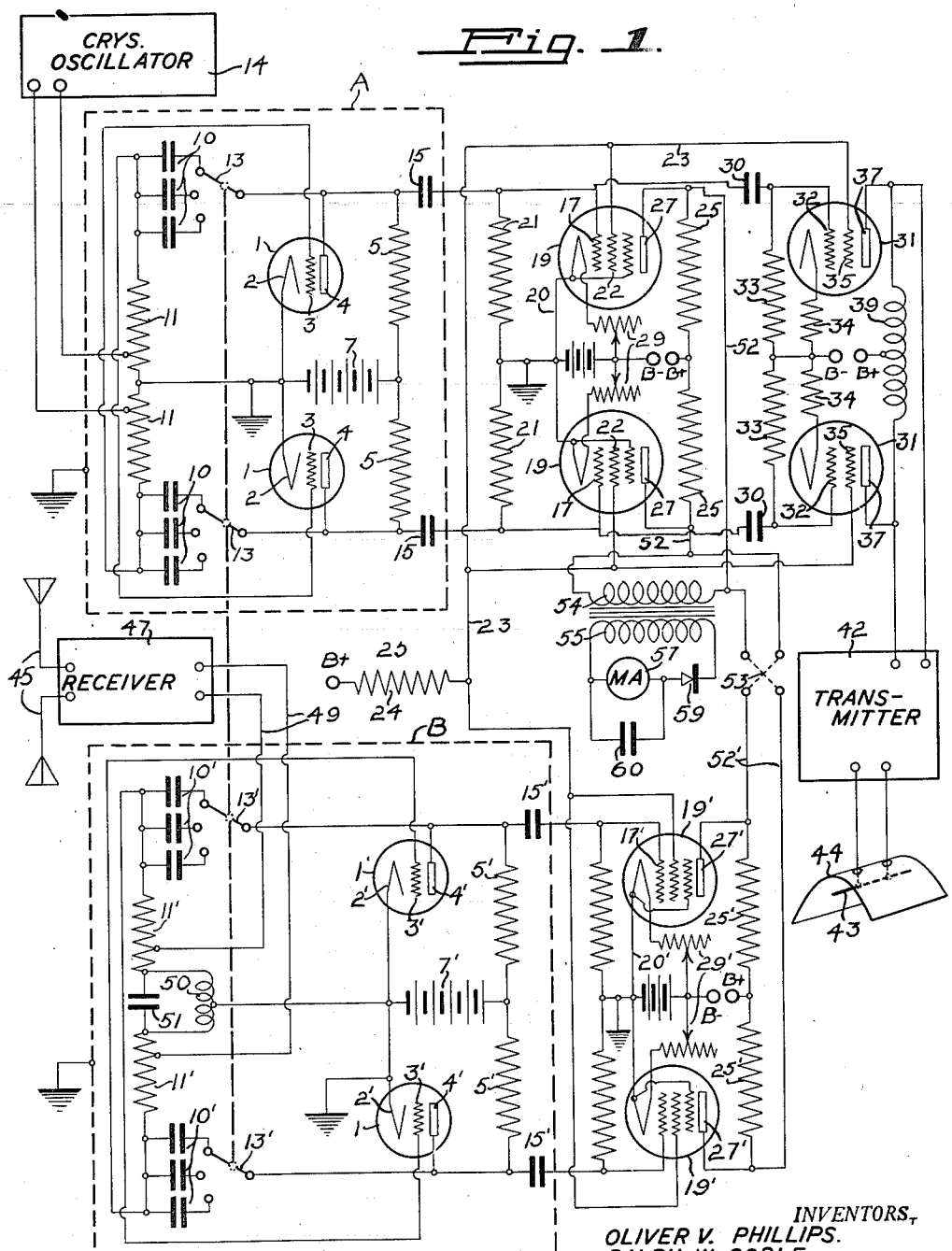

Patented Dec. 25, 1945

2,391,411

UNITED STATES PATENT OFFICE 2,391,411

TERRAIN-LEVEL ALTIMETER

Ralph W. Goble and Oliver V. Phillips, Long Beach, and Donald K. Lippincott, San Francisco, Calif., assignors to Leo M. Harvey, La Canada, Calif.

Application January 24, 1941, Serial No. 375,792

20 Claims. (Cl. 250—1)

This invention relates to altimeters, and particularly to absolute or terrain-level altimeters.

Among the objects of the invention are to provide a radio altimeter whose readings are linear with altitude; to provide an altimeter having multiple scales, whereby the altitude at which an airplane is flying above the underlying terrain may be read directly through a wide range of altitude, and wherein by change of scale, increasingly accurate indications may be had as the altitude becomes less; to provide an altimeter wherein indications of maximum accuracy may be obtained of elevation as measured from some datum other than ground level, for high level bombing; to provide a radio altimeter whose indications are independent of the amplitude of the received wave from which the indication of elevation is derived; and to provide a radio altimeter of relatively simple construction, and which is capable of withstanding the vibration and hard usage to which such equipment may be subjected.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

The broad principle underlying our invention, as is the case with all radio altimeters, involves transmitting a radio signal from the aircraft whose altitude is to be measured, and to determine the altitude by measuring the time required for a portion of the waves carrying this signal and reflected from the ground to return to the plane, the altitude of which is then the known speed of propagation of radio waves times the time interval between transmission and reception.

The intervals to be measured by this method are extremely brief, and development in this field has been devoted very largely to methods for measuring these brief intervals.

In accordance with our invention the standard of measurement is the frequency of a controlled oscillator whose wavelength is known and whose waveform is accurately controlled. The oscillator wave is then modulated upon the wave of the radio transmitter in the aircraft, either directly or in the form of a wave from which the oscillator waveform may be accurately reconstructed e. g., in the form of a derivative of the oscillato wave. The radio signal carrying the wave is re ceived on the aircraft, amplified, detected, an the oscillator waveform is accurately recon structed both in form and amplitude. This re constructed wave or "comparison wave" is thei mixed with the oscillator wave in such phase a to cancel out completely when the plane is a datum level. As the plane rises above this leve the cancellation will no longer be complete, fo the two waves will no longer be exactly 180° out of-phase, but will, instead, be out-of-phase by a angle of 180° plus the phase angle of the transi time of the radio wave. A resultant current wil accordingly flow, the magnitude of which depend upon the amplitude of the oscillator and com parison waves, the waveform, and the phas angle. If the two waves are sinusoidal in forr this resultant current will vary as the sine o the phase angle, being proportional to $$\sin \frac{2H}{\lambda}$$

where $\lambda$ is the wavelength of the modulatin oscillator and H is the altitude of the airplan If this current be rectified and read on a D.-C instrument, the resultant readings will increas provided amplitude is constant in accordanc with the sine function up to an elevation $$H = \frac{\lambda}{4}$$

above which it will again decrease. For som purposes, therefore, the use of sine waves fc the modulating signal is not disadvantageou since it gives readings which are nearly propor tional to altitude for small altitude change with a slower rate of increase with increasin altitude, where less accuracy is required.

Sine waves may be generated with great ac curacy of waveform, and can be reproduced wit almost equal accuracy under certain circum stances. We prefer, however, to use so-calle "square waves," i. e., waves of substantially rec tangular waveform wherein the current rise suddenly to a maximum value, remains at th value for practically the entire half-period of th wave, and then as suddenly reverses and re mains at a maximum negative value for the re maining half-period. If a truly rectangular wav could be produced, the resultant current reading by the use of this waveform in the altimeter c invention would be directly proportional to altitude H between the limits H=zero and $$H = \frac{\lambda}{4}$$

ually, so-called square waves are never really are, the current reversal taking a finite time n though the reversal be extremely rapid, and py an extremely small portion of the cycle. only result of this lack of strict rectangular- however, as long as the two waveforms are tical, is that the linearity of response holds y between zero and a value slightly less than $$\frac{\lambda}{4}$$

light decrease in the maximum value of read- due to the slightly trapezoidal shape of the e is therefore not important. Exact equality ween the master waves and the comparison es is important, however, and the preferred n of our invention chosen for description il- rates one method of accomplishing this end. eferring to the drawings:

ig. 1 is a schematic circuit diagram showing essential elements of a preferred form of our ntion.

ig. 2 comprises a number of curves illustrating, omewhat exaggerated form, the wave forms loped in various portions of the circuit.

ig. 3 is a block diagram illustrating the ar- gement of elements in a modified form of the ntion.

the embodiment shown in the diagram of 1 the master oscillation is generated by a re-wave oscillator indicated by the general rence character A. Various types of square- e generators are known in the art, and the shown is illustrative merely. That shown is nulti-vibrator" comprising a pair of matched ium tubes 1, each having a filament 2, control 3, and plate 4. The filaments are supplied a common circuit (not shown) which is nded. The plates are connected in push- , through two plate resistors 5, connected in s, with the common point of the two resistors ected to a plate supply, indicated as the bat- 7, and thence to the filament circuit and nd. In general, it is advisable that a sep- e source of plate current be used for this llator, due to the tendency of oscillators of type to synchronize at the frequency of any lation which may be injected into their cir- s.

ch plate connects to the grid of the opposite , through a tapped condenser or bank of con- ers 10, with a grid resistor 11 connecting the grid back to the filament circuit. A icular tap on the condenser banks 10 is ted by means of the tap switches 13, these switches being mechanically interconnected hat the circuit will at all times be completely metrical.

e natural frequency of the oscillator can be ed by changing the tap switches 13. Since, as been shown, the maximum reading of the eter is equal very nearly to $$\frac{\lambda}{4}$$

since it is convenient that the altimeter read ultiples of 1,000 feet, it is desirable that the uency of the master oscillator A be adjust- to frequencies whose wavelengths are mul- s of 4,000 feet. Thus, if it were desired to ide the altimeter with scales of 1,000, 5.000 and 25,000 feet maxima, the multi-vibrator would be designed for natural frequencies of ap- proximately 245,000; 49,180 cycles, and 9,836 cycles, respectively. The frequency of the multi- vibrator is approximately equal to $$\frac{1}{2RC}$$

where R is the resistance of each of the two resistors 11, and C is the capacity of the con- densers 10. The characteristics of the tubes 1, including their internal capacitances and the po- tential of the source 7 also affect the frequency, so that the circuit constants cannot be specified exactly. The higher the frequency, the more critical is the adjustment, and the frequency will, in the last analysis, be adjusted by cut-and-try. Recognizing, therefore, that the values given are only approximate, the resistors 11 may be of the order of 25,000 ohms, and the three available values of the capacity of the condenser-bank 10 may be of the order of 80 micro-microfarads, 400 micro-microfarads, and 2,000 micro-microfarads. It is also obviously possible to vary the value of the resistance as well as that of the capacity.

The natural frequencies to which the oscillator is tuned are not, however, made exactly equal to those corresponding to the selected altitudes, but slightly lower, and the oscillator is stabilized upon the desired frequencies by injecting a stabilizing wave from a fixed frequency oscillator, such as a crystal oscillator 14. This frequency is prefer- ably made accurately equal to the highest fre- quency required of the square-wave oscillator, the output of the crystal being connected across a small percentage of the resistors 11. As is well known, the multi-vibrator will stabilize upon a sub-harmonic of the crystal oscillator which is close to its natural frequency, i. e., upon a fre- quency such that the crystal oscillator frequency is a harmonic of the multi-vibrator frequency. Since the frequencies chosen are all integral mul- tiples of the highest frequency used, it is there- fore only necessary to use one crystal to stabilize the oscillator upon any range desired.

The waveform of the master oscillator A, al- though it approaches very closely to the rectan- gular, departs therefrom in some degree, and the waves generated by it are therefore next passed through a waveforming network, including at least one and preferably a pair of over-loaded tubes. Each of the plates 4 connects through a blocking condenser 15 with the control grid 17 of an amplifier tube 19. It is desirable that these tubes be of the screengrid type, and they are shown as pentodes connected in push-pull, with their filament circuits 20 grounded. The grids 17 are also grounded through the grid resistors 21, and the screengrids 22 may be supplied with their bias through a screengrid bus 23 and resistor 24 from a common plate supply (not shown), which also supplies the plates of the tubes through plate resistors 25.

It has been stated that the tubes 19 are over- loaded, and, in practice, the more badly they are overloaded the better will be the waveform. The characteristics of the tubes 19 are such that they will saturate at values of grid voltage consider- ably less than that with which they are supplied by the master oscillator A. Accordingly, as the output voltage of the respective tubes 1 ap- proaches a maximum in its sudden positive swing, the current to the plate 27 will reach its maxi- mum even more quickly, and will remain at this maximum value until the voltage on the grid 17 reverses, at which instant the plate current will drop to zero. Simultaneously with one tube of the push-pull pair being swung to saturation current value, the other tube will swing to cut-off. The result is a perfectly flat-topped wave whose frequency is governed by the crystal oscillator 14, and whose amplitude is dependent upon the maximum emission of the filament 20 of the tube 19. The tubes 19 are preferably of the directly heated filament type, rather than heater type tubes, and the maximum plate current may therefore be easily adjusted to a predetermined value by means of the filament rheostat 29.

The square-wave output of the tubes 19 may be modulated directly upon the radio wave for transmission to ground and back to the aircraft, but we prefer to use instead a wave whose form is the first derivative of this output wave. The modulating wave of this type may be obtained by passing a portion of the energy from tubes 1 through a differentiating network, coupled to grids 17 through blocking condensers 30, and comprising the tubes 31. These are preferably high impedance screengrid tubes, having control grids 32 connected to the blocking condensers 30 and biased through grid resistors 33, as by the cathode resistors 34. The screen grids 35 are connected to the common screengrid bus 23; the plates 37 connect in push-pull through an inductor 39. Since the tubes 31 are of high impedance, the plate current of these tubes will be proportional to the potentials imposed upon their control grid and substantially independent of the voltage developed across the inductor 39. This voltage is equal to $$L\frac{di}{dt}$$

that is, to the first derivative or rate of change of current with time, resulting in short sharp pulses occurring as the output current of the master oscillator A reverses, being zero during the time when the oscillator current remains constant.

The resulting relationships are shown by the curves of Fig. 2, wherein the light line 40 indicates in general the output current waves of the tubes 19. In the drawing the trapezoidal form of the waves is greatly exaggerated, in order that its effects may be shown more clearly. As will be seen, such waves do not have completely sharp corners, and accordingly, the derivative wave, indicated by the curve 41, does not rise to its maximum value instantaneously. Its slope is, however, much steeper than the slope of the parent wave 40, and it rises to its maximum value much more rapidly than does its parent wave, remaining at its maximum value as long as the oscillator current continues to increase but dropping back to zero when the oscillator current becomes constant.

This wave, with its alternate positive and negative pulses (the latter indicated by the dotted portion of the curve), may be modulated upon the radio transmitter in this manner. It is preferable, however, that only the positive pulses be modulated upon the radio signal, and this can be accomplished, as is well known in the art, by feeding the voltage wave into a tube biased to cut-off. In this manner, the radio transmitter radiates only during the period when the oscillator current is increasing in one direction, and is zero at all other times. The transmitter tubes therefore can be worked at their ultimate output capacity during the short portion of the cycle when they are in use, and this may be several times their capacity as limited by their maximum sa operating temperatures under continuous us Furthermore, since the tubes are operating on a small portion of the time, the drain on the pla supply is correspondingly less.

The radio transmitter 42 can operate at a frequency that appears desirable, but practic considerations will make this frequency as high possible, even though it is not, in theory, limit to any particular value. Practically, however, frequency in the "ultra-high" range—above megacycles—is indicated because of the small si of efficient antenna structures in this range, a also because of the relative ease of providing c rective antenna arrays for such ultra-short wave In the diagram the antenna is shown as a dipo 43 positioned in a parabolic reflector 44. A ho antenna or other directive type suitable for t frequency employed may, of course, be substitute but it is important that whatever type be used be sufficiently highly directive so as to preve direct radiation from reaching the receiving a tenna mounted on the same aircraft. The dire tion is, of course, downward as the device is ord narily used, but it is within the scope of th invention that the directivity may be in any c rection from which reflected waves be receiv and from which it is desired to measure the di tance to the point of reflection.

The receiving antenna 45 may also preferab be of a directive type, since a directive receivir antenna will increase both the shielding effe reducing the possibility of picking up direct in stead of reflected waves from the transmitter, a the effective sensitivity, thus reducing the nece sary transmitter power.

The radio receiver 47 may be of any type adap ed to pick up the reflected waves from the tran mitter. A superheterodyne receiver is not out the question for this purpose, particularly if t frequency used be the lower portion of the ultr high frequency range, but we have found th when higher frequencies within the range are en ployed a receiver of the super-regenerative ty is lighter and easier to keep in adjustment, a that it is therefore to be preferred. It shou have sufficient amplification so that the detect signal delivered to its output leads 49 will be fair amplitude even at maximum altitudes.

The pulses derived from the received waves a fed to a square-wave oscillator B which is su stantially a duplicate of the oscillator A a whose elements are therefore distinguished by t same reference characters, distinguished by a cent. The tuning switches 13' are mechanical linked with the switches 13, so that the two osci lators tend to operate at the same frequency.

The received pulses are applied across a po tion of the resistor 11' and thus serve to sy chronize the oscillator B in the same manner th those from the crystal oscillator 14 synchroni the oscillator A. Because, however, in the pr ferred form of the device only one synchronizir pulse per cycle is transmitted, and because relax tion oscillators in general do not necessarily pr duce symmetrical waves, there is included in seri between the resistors 11' and a tuned circuit con prising an inductor 50, and condenser 51, the na ural frequency of this tuned circuit being acc rately equal to the frequency of the crystal osci lator. This circuit will accordingly resonate the same harmonic of the oscillator frequency is injected into oscillator A by the crystal oscill tor, and thus hold the oscillator B in synchronis as regards both halves of its cycle.

scillator B feeds a wave-shaping network
h is a duplicate of that fed by oscillator A
whose elements are also distinguished by the
e reference characters, accented. The output
s 52' connect through a reversing switch 53
ie primary 54 of a supersonic frequency mix-
transformer. This transformer is also fed
the shaped output wave from the oscillator
rough the leads 52. As shown, the two waves
fed in parallel to the same primary coil, but
rate balance primaries may be used if de-
1.

should here be pointed out that it is the fact
output waves of the two oscillators are thus
ed that makes it very important that shield
tubes 19 and 19' be used in the two wave-
ing networks. The tendency of relaxation
lators to fall into synchronism has already
mentioned, and one of the functions of the
e-shaping networks is to act as buffer-stages
revent reaction back through the tubes. The
lators A and B must be carefully shielded to
ent any such interaction, and in practice such
lding would be carried throughout the sys- As, however, complete shielding is standard
tice in high-frequency circuits, such complete
lding has not been indicated in the drawings,
ough the shielding of the two oscillators,
re it is particularly important, has been in-
ted by the broken-line rectangles A and B
ectively.

ie secondary coil 55 which is coupled to the
iary coil 54 feeds a milliammeter 57 through a
ifier 59. An integrating condenser 60 is pref-
ly bridged across the milliammeter, as is
dard practice in such cases.

use, the two oscillators A and B are adjusted
hat they give equal output of a definite or
dard value. This may be done by means of
filament rheostat 29, 29', and will be accom-
ied if each oscillator, operating alone, with
other de-energized, gives a predetermined
ing on the milliammeter 57. This reading
be nearly half scale, and would be exactly
scale if the wave form were truly rectangular
ad of trapezoidal. If desired, separate me-
ig circuits may be provided for the purpose.
this condition obtained, it is obvious that
oscillator B will deliver to the mixing circuit
ave 61 (Fig. 2) which is identical with the
40 of the oscillator A with the exception of
ase angle $\phi$. If the aircraft be on the ground,
the reflecting surface immediately adjacent
two antennae, the phase angle $\phi$ will be van-
gly small, but as the plane rises, so that the
sit time of the wave from the transmitter
round level and back becomes material, the
e $\phi$ will attain a finite value which is equal
ther $$\frac{4\pi H}{\lambda}$$

is quantity plus $\pi$, depending upon the setting
ie reversing switch 53.

der ordinary conditions, that is, for meas-
ients from ground level, the switch 53 is so
hat $$\phi = \frac{4\pi H}{\lambda} + \pi$$

so that the waves are exactly 180° out-of-
e when the altitude of the aircraft is zero.
round level, then, the two waves will exactly
el out and there will be no reading of the
ammeter 57 since no resultant current will flow in the secondary coil 55. When, however,
a finite transit time is required for the reflected
wave to reach the receiver a resultant current
will flow in the coil 55 which is equal to the
difference in ordinates between the curves 40 and
61. The average value of this current, integrated
over one-half cycle, will be proportional to the
area 62 between the two curves, and it is easy
to see from the diagram that this area will vary
directly as $\phi$ until $\phi$ becomes so great that the
point 63 on curve 40 coincides with the point 64
on curve 61, this area being equal to $2\phi E$ where
E is the maximum current from the oscillator,
giving an average current of $$\frac{2\phi E}{\pi}$$

The waveform of this current, for the value of $\phi$
shown, is illustrated in curve 65. As $\phi$ increases
the current peaks of this latter curve will
broaden, until, when $\phi = 2\pi$ (since it equals $\pi$ at
ground level) the shape of the curve 65 will be
the same as that of the curve 40, but with double
amplitude.

The milliammeter 57 being a direct current,
permanent magnet instrument, such as a d'Arson-
val galvanometer, will read the average value of
the resultant current as indicated by the curve
65, the negative peaks of this current being sup-
pressed by the rectifier 59. Its reading will
therefore be directly proportional to $\phi$, and hence
to the altitude, up to the point where the points
63 and 64 coincide at a value of $\phi$ slightly less
than $2\pi$. From this point up to $\phi = 2\pi$ the in-
crease will be at less than the linear rate, while
when $\phi$ becomes greater than $2\pi$ the rate of
change with altitude will reverse.

It has already been stated that the trapezoidal
form of the wave has been exaggerated in the
figure. Even with this exaggerated slope of the
sides of the wave it is apparent from the figure
that only a very small portion of the scale will
be non-linear, perhaps the last hundred feet of
a 1,000 foot reading. Since the reading reverses
in direction at the limit of the scale, the indicated
altitudes at this limit become indeterminate, and
the scale reading should not be relied upon in
this region in any event, but the altimeter
should be switched to the next higher range when
this region is approached, and hence the slight
range of non-linearity is not important.

It is evident that since all altitude readings
are taken from a selected one of multiple scales
on an instrument of fixed sensitivity, the accuracy
of the reading will be a constant percentage of
full scale, which ever the scale chosen. Thus
if the meter 57 be accurate to one-half of one
per cent, readings on the 1,000 foot scale will be
accurate to five feet, on the 5,000 foot scale to
twenty-five feet, and on the 25,000 foot scale to
one hundred twenty-five feet. Ordinarily this
will be sufficiently accurate for all practical pur-
poses, but there are some instances, as in the
case of level bombing, where it is desired to know
the ground level altitude with extreme accuracy.
With the approximate level known from one of
the higher-reaching scales, the exact level may
be found from the lower scale to the maximum
accuracy of which the instrument is capable,
since, with the arrangement described, there is
effectively a datum above which the altitude can
be measured, at every 1,000 feet.

Assuming, for example, that the plane be flying
at an altitude of almost exactly 1,000 feet, a reversal of the switch 53 will change the value of $\phi$ by the quantity $\pi$, and the meter will then read the deviation of the plane from 1,000 feet. It will not show whether the plane be above or below the 1,000 foot level except as that will be indicated by decreasing readings if the plane be below 1,000 feet and climbing and by increasing readings if the plane be above 1,000 feet and climbing, but it will indicate with great exactness the deviation from the 1,000 foot level. The same will hold true at any 1,000 foot level up to and beyond the highest range of the instrument, and a switch to the high range will always show immediately which 1,000 foot level is the datum. This procedure is not, of course, recommended for navigational purposes, nor is it necessary for such purposes, but it may be of great value in range finding operations for bombing or, for example, for meteorological work.

With the equipment and procedure thus described there is one error that has not been mentioned, and that is the zero error resulting from the fact that the oscillator B is triggered by the pulses derived from oscillator A, and that although these pulses are sharp their slope is not infinite. Oscillator B must therefore lag very slightly behind oscillator A, giving the zero error before mentioned. If the equipment be designed for a minimum full scale reading of 1,000 feet, and is carefully designed and constructed, this error is too small to be of any importance, and may be neglected. If, however, the device is to be used for terrain level measurements of extreme accuracy the error may become appreciable, and a method by which it may be minimized, if not avoided altogether, is shown on the block diagram of Fig. 3.

In this modification of our invention the crystal oscillator 14, instead of stabilizing oscillator A directly, is used to stabilize the pulse generator 70 which, in turn, excites oscillator A. Where square-wave generators of extremely high frequencies are used, as they must be where the maximum reading of the lowest scale is below 1,000 feet, the use of such pulse generators is valuable in producing square-wave forms, as has been shown by Fenn in an article in the Review of Scientific Instruments, November, 1940, where such generators and oscillators are shown and described. In the modification of Fig. 3 the pulses from the generator 70 are also fed to the transmitter 42, which is thereby modulated with the same pulses that are used to trigger the oscillator A. The radio waves, modulated by these pulses, are radiated from the antenna 43, picked up by the antenna 45, detected in the receiver 47, and trigger oscillator B. The wave shapers, indicated by the reference characters 71 and 71', reversing switch 53 and the mixing circuits are the same as before. The only difference is that the pulse, which is of the same character as that shown in curve 41, is the pulse that triggers oscillator A instead of being derived therefrom. In form it is the derivative of the curve 40, but it is not, in the physical sense, a derived curve, even though it is a curve from which the curve 40 may be reconstructed. The use of the pulse generator has, accordingly, a definite theoretical advantage over the form of the device shown in Fig. 1. Its disadvantage is that it involves additional equipment and hence additional weight.

The zero error inherent in the tripping time of oscillator B does not appear, of course, if the waveform of curve 40 be modulated directly upon the transmitter 42, and the detected wave used directly, instead of to trip oscillator B. This, of course, simplifies the apparatus materially, since neither the differentiating network nor a pulse generator is necessary, but the transmitter is modulated directly by the output of the waveforming network. It also simplifies the receiving equipment, since the receiver 47, if it be provided with an accurate automatic volume control, can have its leads 49 connect directly to the leads 52', omitting all of the intermediate equipment. If the transmitter frequency be so high that satisfactory automatic volume control is difficult or unattainable, sufficiently accurate results may be obtained by omitting only the oscillator B, and connecting the leads 49 directly to the grids 17' of the waveforming network.

Mention has already been made of the fact that the broad principle of our invention is not dependent upon the use of square waves, and if sufficiently accurate volume control is used sine wave oscillators may be substituted for oscillators A and B and their associated waveforming networks. Since accurate sine wave oscillators are well known in the art and since the only difference involved in the mixing circuit would be that the milliammeter would be provided with a sinusoidal scale, instead of a linear one, it is not believed necessary to show the sine wave modification in detail.

Other obvious modifications are the use of separate crystals for producing the different frequencies corresponding to the various scales, and the use of other types of square wave oscillators, such as those described by Fenn in the article above mentioned.

We claim:

1. A terrain-level radio altimeter comprising a master oscillator, of relatively low frequency, a radio transmitter of relatively high frequency, means for modulating said transmitter with a signal developed by said oscillator, a directive antenna system fed by said transmitter, a receiver adapted for the reception of signals from said transmitter, an antenna feeding said receiver and shielded from direct radiation from said transmitter antenna but receptive to reflected waves therefrom, means for developing from the reflected signals received by said receiver from said transmitter an oscillation substantially equal in amplitude and wave form as the oscillations supplied to said transmitter by said master oscillator and means for determining the phase difference of said oscillations.

2. A terrain-level altimeter in accordance with claim 1 wherein the wave form of said oscillator is substantially rectangular.

3. A terrain-level altimeter in accordance with claim 1 wherein the wave form of said oscillator is substantially rectangular, and said developing means comprises an oscillator triggered by the modulation of said transmitter signals.

4. A terrain-level altimeter in accordance with claim 1 wherein the wave form of said oscillator is substantially rectangular and including a second oscillator substantially identical with said first mentioned oscillator in output and wave form and means for triggering said second oscillator with signals from said receiver.

5. A terrain-level altimeter in accordance with claim 1 wherein the wave form of said oscillator is substantially rectangular and including a differentiating circuit fed by said oscillator, means for modulating said transmitter with a derivative signal developed in said circuit, a second oscillator substantially identical with said first menned oscillator in output and wave form comsing said developing circuit, and means for inting into said second oscillator said derivative nal from said receiver.

. A terrain-level altimeter comprising a iare-wave master oscillator, a stabilizing oscilor connected to synchronize said master oscilor at a predetermined frequency, a square-wave nparison oscillator of substantially identical iracteristics with said master oscillator, a radio nsmitter, means actuated by the output of said ster oscillator for modulating said transmitter, adio receiver including an antenna shielded m direct radiation from said transmitter but eptive to reflected radiation therefrom, means injecting a modulation component from said eiver into said comparison oscillator to stabilize same at the frequency of said master oscillator l in phase dependent on the transit time of liation from said transmitter reflected to said eiver, a mixing circuit connected to the outs of both of said oscillators, and means for asuring the mean amplitude of the resultant the mixed oscillations from said oscillators.

. A terrain-level altimeter in accordance with im 6 including modulating means comprising differentiating circuit for supplying pulses ied with the oscillations of said master oscilor to modulate said transmitter.

. A terrain-level altimeter comprising a iare-wave master oscillator, a stabilizing os.ator connected to synchronize said master os.ator at a predetermined frequency, a squareve comparison oscillator of substantially idenal characteristics with said master oscillator, adio transmitter, means for modulating said nsmitter with pulses synchronous with resals of current from said master oscillator, a lio receiver including an antenna shielded from ect radiation from said transmitter but recepe to reflected radiation therefrom, means for ecting a modulation component from said rever into said comparison oscillator to stabilize same at the frequency of said master oscilor and in phase dependent on the transit time radiation from said transmitter reflected to d receiver, a mixing circuit connected to the puts of both of said oscillators, and means for asuring the mean amplitude of the resultant the mixed oscillations from said oscillators.

. A terrain-level altimeter in accordance with im 8 including means for stabilizing said oscilors at a plurality of integrally related subrmonics of the frequency of said stabilizing os.ator.

10. A terrain-level indicator in accordance h claim 8 including means for reversing the ative phases of said master oscillator and said nparison oscillator.

11. A terrain-level altimeter in accordance h claim 8 including amplitude measuring ans comprising a linear current meter conted to said mixing circuit, and a rectifier in ies therewith.

12. The method of determining the distance ween an aircraft and the surface beneath it ich comprises the steps of generating an oscilion of predetermined wave form, wave length d amplitude, modulating a radio wave in acdance with said oscillation, transmitting said ve from said aircraft toward said surface, reving on said aircraft a portion of said wave reted from said surface, detecting the modulatcomponent of said received wave, reconstructing from the detected modulating component an oscillation equal in wave form and amplitude to said original oscillation, mixing said oscillations, and determining from the phase difference of said oscillations as measured by the value of the resultant mixed oscillations the altitude of said aircraft.

13. The method in accordance with claim 12 wherein said oscillations are of substantially rectangular wave form.

14. The method in accordance with claim 12 wherein said oscillations are of substantially rectangular wave form and including the steps of generating on said aircraft a second oscillation of similar wave form, wave length, and amplitude to said first mentioned oscillation, and applying said modulating component to synchronize said second oscillation.

15. The method in accordance with claim 12 wherein said oscillations are of substantially rectangular wave form and including the steps of modulating said radio wave with a wave form substantially the derivative of said oscillation, generating on said aircraft a second oscillation of similar wave form, wave length and amplitude to said first mentioned oscillation, and applying said modulating component to synchronize said second oscillation.

16. A terrain-level altimeter in accordance with claim 8 including wave-forming networks connected to receive the output of each of said amplifiers, each of said networks including an overloaded vacuum tube.

17. In a system for indicating the distance of a wave-reflecting surface wherein a radio wave is modulated with a signal of predetermined waveform, wavelength and amplitude, transmitted to be reflected by said surface and the reflected wave received at a point in predetermined position relation to the point of wave transmission, the improvement comprising the steps of detecting the modulating component of the received wave, reconstructing from the detected modulating component a signal equal in waveform and amplitude to the original signal, mixing said signals, and determining from the phase difference of said signals as measured by the value of the resultant mixed signals, the distance of said reflecting surface.

18. The method of determining the distance between a radio transmitting and receiving location and a radio wave reflecting surface which comprises the steps of generating an oscillation of substantially rectangular waveform, modulating a radio wave in accordance with said oscillation, transmitting said wave from said location toward said surface, receiving at said location a portion of said wave reflected from said surface, detecting the modulating component of said received wave, mixing said received modulating component with the original transmitter modulating oscillations, and determining from the phase difference of the mixed currents the distance of said surface.

19. The method of determining the distance between a radio wave transmitting and receiving location and a radio wave reflecting surface which comprises generating an oscillation of predetermined waveform, wavelength and amplitude, modulating a radio wave in accordance with said oscillation, transmitting said wave from said location toward said surface, receiving at said location a portion of said wave reflected from said surface, detecting the modulating component of said received wave, reconstructing from the detected modulating component an oscillation equal in waveform and amplitude to said original oscillation, mixing said oscillations, and determining from the phase difference of said oscillations as measured by the value of the resultant mixed oscillations the distance of said surface.

20. The method of determining the distance between a radio wave transmitting and receiving location and a radio wave reflecting surface which comprises generating an oscillation of predetermined waveform, wavelength and amplitude, modulating a radio wave in accordance with a derivative of said oscillation, transmitting said wave from said location toward said surface, receiving at said location a portion of said wave reflected from said surface, detecting the modulating component of said received wave, reconstructing from the detected modulating component an oscillation equal in waveform and amplitude to said original oscillation, mixing said oscillations, and determining from the phase difference of said oscillations as measured by the value of the resultant mixed oscillations the altitude of said surface.

RALPH W. GOBLE.
OLIVER V. PHILLIPS.
DONALD K. LIPPINCOTT.